Sept. 24, 1968  R. J. BENNETT  3,403,249
BATTERY POWERED SIGNAL UNIT
Filed Dec. 22, 1965  4 Sheets-Sheet 1

INVENTOR.
ROSWELL J. BENNETT
BY
ATTORNEY

Sept. 24, 1968 R. J. BENNETT 3,403,249
BATTERY POWERED SIGNAL UNIT
Filed Dec. 22, 1965 4 Sheets-Sheet 2

INVENTOR.
ROSWELL J. BENNETT
BY
ATTORNEY

Sept. 24, 1968  R. J. BENNETT  3,403,249
BATTERY POWERED SIGNAL UNIT
Filed Dec. 22, 1965  4 Sheets-Sheet 4

INVENTOR.
ROSWELL J. BENNETT
BY
ATTORNEY

United States Patent Office 3,403,249
Patented Sept. 24, 1968

3,403,249
BATTERY POWERED SIGNAL UNIT
Roswell J. Bennett, Lakewood, Ohio, assignor to Union Carbide Corporation, a corporation of New York
Filed Dec. 22, 1965, Ser. No. 515,566
18 Claims. (Cl. 240—10.63)

This invention relates to a battery powered signal unit and more particularly refers to a novel battery powered light source or signal lantern adapted for use as a replaceable unit in railway signal lamps, navigational lights or the like.

Heretofore, in the railroad industry particularly signal lanterns containing an oil lamp as the light source have been and currently are still employed. These oil-burning signal lanterns although highly successful have high maintenance cost and have been considered in need of improvement specifically with respect to the light source and the energy generator. The subject patent application covers a replaceable signal lantern unit which overcomes the disadvantages of the prior art and which revolutionizes railway signal lamps by converting said heretofore oil lighted lamp to a battery powered lamp embodying air-depolarized cells with a minimum of changes and without necessitating a redesign of the entire external railroad lamp housing.

Accordingly, it is the principle object of the invention to provide a novel battery powered light source which is adapted for use as a replaceable unit in railway signal lanterns, navigational aids or the like.

It is another object of the invention to provide a battery powered light source which is so constructed and arranged that it is capable of withstanding substantial mechanical shocks and vibrations.

It is yet another object of the invention to provide a battery powered light source which is so constructed and arranged so as to form an efficient, highly compact, rugged assembly capable of long service life and substantially no maintenance requirements.

Yet still another object of the invention is to provide a battery powered signal lantern unit of unitary construction designed to be replaceable after discharge.

Other objects, features and advantages of the present invention will be apparent from the following detailed description of an embodiment thereof, taken in conjunction with the accompanying drawings, in which.

Figure 1:
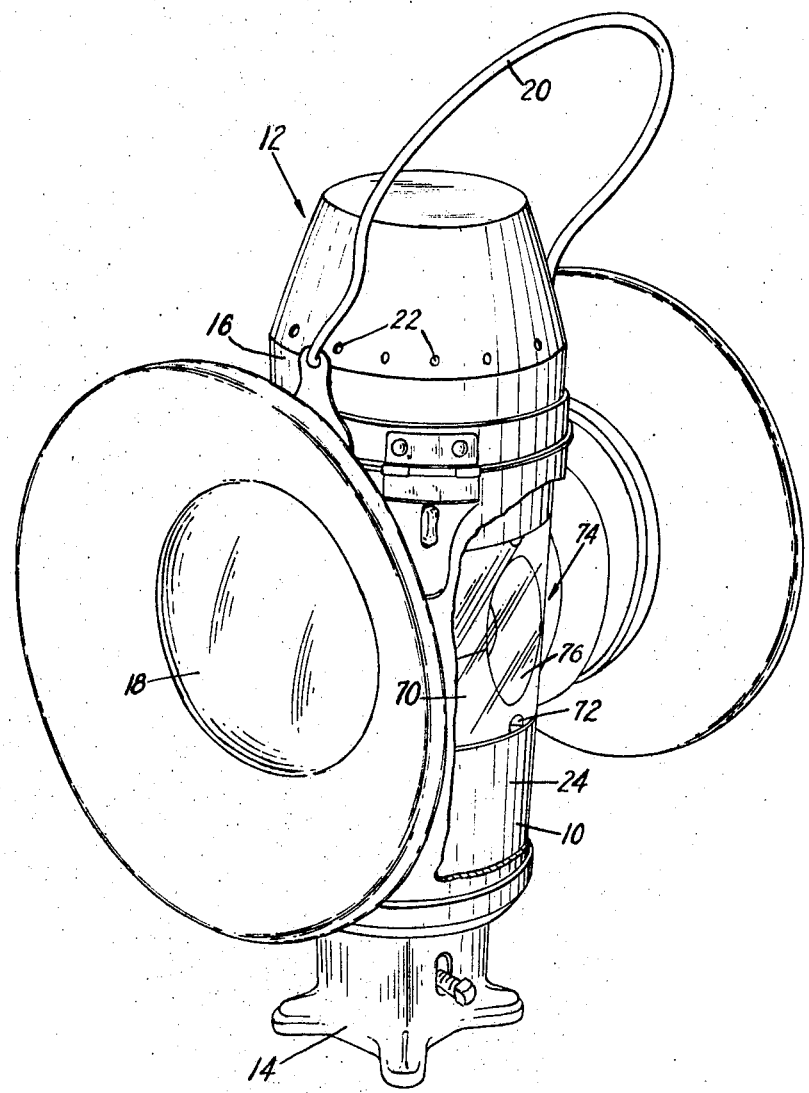
FIGURE 1 is a perspective view partly broken away, illustrating the battery powered signal unit of the present invention installed in a basically conventional railroad lamp housing.
Figure 2:
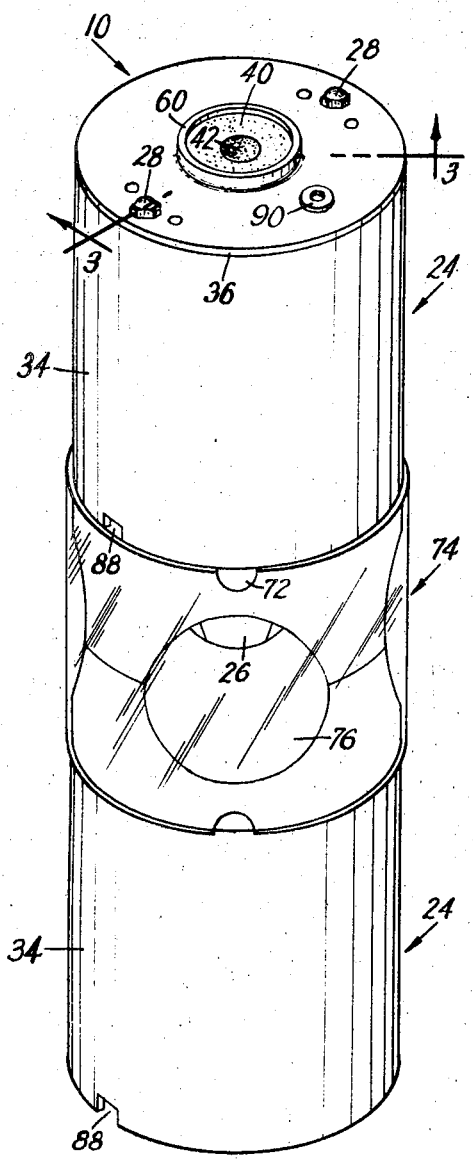
FIGURE 2 is a perspective view of the battery powered signal unit or assembly of FIGURE 1.
Figure 3:
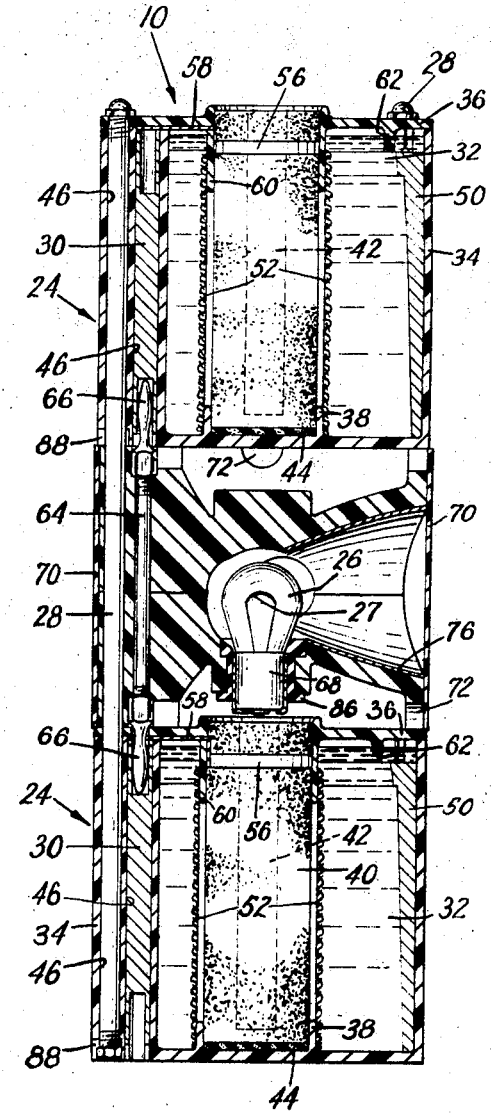
FIGURE 3 is a vertical section, taken along the line 3—3 of FIGURE 2 and showing the inner details of construction of the battery powered signal unit of the invention.

Referring now to the drawing and particularly to FIGURES 1, 2 and 3, there is shown a battery powered signal lantern or unit 10 of the invention. The lantern unit 10 is removably inserted into a conventional railroad switch lamp housing 12, as best shown in the cutaway view of FIGURE 1. As shown therein, the unit 10 is adapted to fit within a trackside railroad oil light switch assembly. This assembly generally comprises a central housing 12 including a lower stand portion 14, a cover 16 suitably removably mounted by hinges (not shown) on the top of the housing 12 in closure relation thereto, and a plurality of translucent lenses 18 (only one shown) facing horizontally at points spaced about a vertical axis through the central housing 12. The housing 12 is usually equipped with a hook or bail 20 to facilitate carrying the switch light assembly should it be necessary to do so. Suitable venting means, such as apertures 22, are shown in the cover 16 since the cells employed in the signal unit of the invention are of the air-depolarized type and consequently require access to atmospheric oxygen.

In FIGURES 2 and 3, there is shown the replacement assembly or unit 10 of the invention, FIGURE 3 being a vertical section through the line 3—3 of FIGURE 2. The replacement unit 10 comprises a pair of suitable cells, such as the air-depolarized cells 24, disposed in axial alignment and apart from each other. These cells 24 are identical and interchangeable so as to greatly simplify initial assembly of the replacement unit 10. It should be apparent from the figures that the bulb and reflector (hereinafter identified) can be employed with a number of replaceable cells and need not be disposed of after the cells are discharged. Suitable lamp means or light source, such as bulb 26 electrically connected in series with the cells 24, is positioned between the two cells 24 in a manner such that the level of illumination or light intensity supplied by the bulb 26 during use is substantially the same in the zone between the two unit cells 24. In this regard, the light distribution is such that in any unobstructed direction from the bulb 26, the light meter readings are substantially the same. Although the bulb 26 is shown mounted in a vertical position in FIGURE 3, it can also be mounted at an angle, e.g., 45 degrees from the vertical axis. This feature permits the spacing between the cells to be minimized without sacrificing the light output desired and permits the space within the housing 12 available for active cell materials to be correspondingly increased. The vertical location of the bulb 26 is critical in that the position of the filament 27 will substantially coincide with that of the oil flame in the present railroad switch lanterns and hence the filament should be located at the common focal point of all of the lenses 18.

Figure 6:
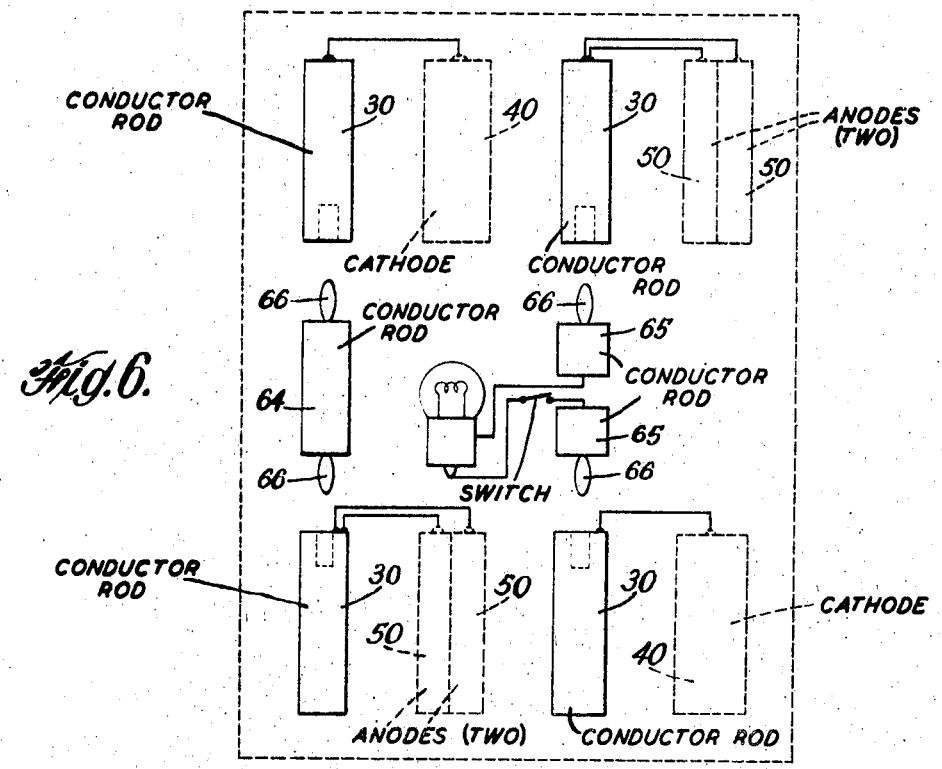
FIGURE 6 is a schematic view of the electrical circuitry of the signal unit shown in FIGURES 2 and 3.

The cells 24 are held as a unit by suitable tie-rods 28 which may be equipped with spacing means (not shown) for maintaining the gap or space between the cells 24. For the moment the means for spacing the cells 24 apart from each other will be discussed hereinafter. Tie-rods 28 are preferably of a conductive material so as to enable them to serve as conductors in the electrical circuitry of the unit 10. As shown in FIGURES 3 and 6, separate electrical conductors 30 may also be suitably employed in the practice of the invention.

In the replacement unit 10, the cells 24 are not mounted in a back-to-back fashion but both cells are disposed "right side" up. This is a requirement of the particular cells illustrated herein, i.e. the air-depolarized cells. Of course, with other suitable cells no such restriction may be necessary. In fact, if the electrolyte 32 of the cells 24 is immobilized then these cells could also be disposed, if necessary, upside down. If desired, the replacement unit 10 may also be equipped with a suitable reflector 74 having appropriate reflecting surfaces, as will hereinafter be more fully described, which serve to concentrate and direct the light beam for maximum efficiency.

Each cell 24 is of the carbon-zinc air-depolarized type and comprises a cell housing 34 preferably of cylindrical shape so as to maximize the available cell space permissible by the limited size of the railroad switch lamp housing 12. The cell housing 34 is preferably cup-shaped and of a non-conductive material resistant to caustic attack. Suitable materials of construction for such housings are plastics such as polystyrene, polyvinyl chloride, hard rubber, high density polyethylene, polysulfone and acrylonitrile-butadiene-styrene copolymers. The cell housing 34 is also provided with a cover 36 of the same material of construction as the cell housing 34.

At the base of the cell housing 34 is a suitable electrode positioning means comprising a raised annular rib 38 for maintaining the location of the central cylindrical carbon cathode 40 and for positioning and holding the bottom end of separator 52. The carbon cathode 40 is of the customary porous activated carbon type which is permeable to gas but repellent to the electrolyte and is suitably equipped with a "blind" central aperture or hole 42 to enhance circulation of air through the electrode. This aperture or hole 42 may also be divided by a suitable partition into two semi-circular shaped apertures connected at the lower portion of the electrode to further facilitate the circulation of air through the hole. Other suitable carbon cathode materials which may be employed in the practice of the invention are well known to those skilled in the art.

Between the base of the cathode 40 and the bottom of the cell housing 34 a pressure pad having suitable shock absorbing characteristics is disposed. As best shown in FIGURE 3, the elastomeric disc 44 is positioned within the raised annular rib 38 and thus cushions the cathode 40 from mechanical shocks and vibrations. The cell housing 34 is also provided with suitable passageways such as hollow ribs 46 for permitting the passage of the tie-rods 28 and for, as shown in this modification, the passage of electrical conductor rods 30. This pair of double ribs 46 are preferably in the same plane so as to divide the cell housing 34 into two equal half portions. The outer ribs 46 are suitable for the passage of the tie-rods 28 and the inner ribs 46 are for the conductor rods 30. Suitably, a pair of semicircular amalgamated zinc anodes 50 are securely disposed in a snug fashion about the inner periphery of the cell housing 34 between the ribs 46 which also may serve as a locking mechanism to hold the anodes 50 in place therebetween. Obviously, if the tie-rods 28 and conductor rods 30 or combined tie-rods and conductor rods are disposed about the outside periphery of the cell housing 34, then the anode may be a one-piece hollow cylindrical element since no internal ribs would be necessary.

A suitable separator 52 in the form of a hollow cylindrical body is disposed over and around the carbon cathode 40 and the raised annular rib 38 in the bottom of the cell housing 34. The separator 52 is made of a loosely woven caustic-resistant material, such as polypropylene, etc. or a material made of polyamide or vinyl copolymer resins (e.g. copolymers of vinyl chloride and acrylonitrile).

Figure 4:
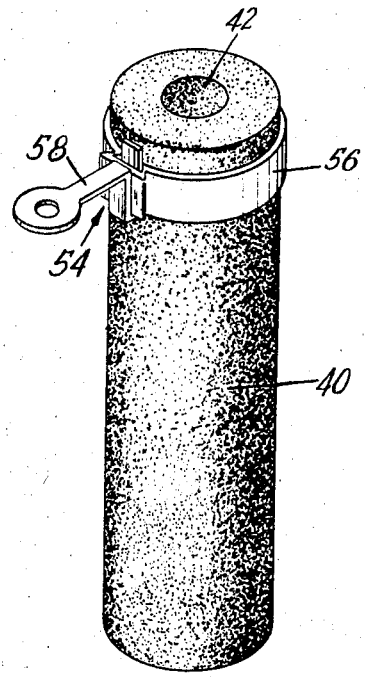
FIGURE 4 is a perspective view of the carbon cathode of the air-depolarized cells illustrated in FIGURES 2 and 3.

Attached in a suitable manner to the top of the cathode 40 is a suitable cathode lead 54, as best shown in FIGURE 4. The cathode lead 54 may comprise a thin metallic band 56 crimped around the upper end of the cathode 40; the band 56 may also be equipped with suitable projecting teeth or barbs (not shown) for providing a firm and intimate contact with the carbon surface of the cathode 40. Similarly, another form of cathode lead may be a "shrink-fitted" annular ring. A suitable small wire or tab 58 extending laterally from an annular ring or the band 56 is securely affixed thereto and to the electrical conductor rods 30 as will hereinafter be described in connection with FIGURE 6.

The entire cell housing 34 is suitably closed by the top cover 36 and is appropriately sealed theretogether by conventional means, such as cementing, heat sealing, etc. The cover 36 is provided with a central annular collar 60 for holding the upper end of the cathode 40 and the upper end of the separator 52. If desired, small vent holes (not shown) may be provided around the periphery of the collar 60. Such holes would vent gases, such as hydrogen, from the air space above the electrolyte 32 to the external atmosphere. The holes should also be protected by conventional means so as to be electrolyte-repellent. If desired, a shield or "protective" porous disc (not shown) may be securely positioned atop the cathode 40 and within or about the central annular collar 60. Rod-like projections 62 extending from the under side of the cover 36 serve as spacers and assist in maintaining the anodes 50 fixedly in place.

The cells 24 are suitably connected in series as schematically illustrated in FIGURE 6. As noted hereinabove, the electrical connections between the upper and lower cells 24 are provided by the conductive rods 30 extending through the space between the cells 24. The ends of central conductor rods 64 and 65 are suitably connected to the upper and lower conductor rods 30, such as by standard banana plugs 66. These plugs 66 are inserted into the hollow ends of the conductive rods 30. As shown in FIGURE 6, one of the two central conductor rods 65 is interrupted at some point along its length in order to connect the bulb 26 in series. Note that the switch shown schematically in FIGURE 6 is optional inasmuch as in some applications, no further switching may be required after the bulb 26 is inserted in the socket. Conventionally, any switch may be embodied in the apparatus of the invention and may be of the manual type, although a suitable solar switch can also be employed. This type of switch would appear to be especially desirable in railroad, marine, highway, etc. type of applications since the bulb 26 can be automatically turned off at daybreak.

Wires (not shown) extending from the bulb base 68 are suitably fastened such as by soldering to the inner ends of the interrupted central conductor rod 65. As best shown in FIGURES 3 and 6, the tabs 58 connecting the cathodes 40 are suitably connected in electrical contact with one of the conductor rods 30, the anodes 50 being electrically connected in a suitable manner to the other of said conductor rods 30.

If desired, a transparent annulus or sleeve 70 may be disposed between the cells 24 so as to provide protection of the bulb 26 from dirt, damage, etc. A plurality of apertures or cutout portions 72 are provided in the sleeve 70 to permit air access to the cathode 40 of the lower cell 24. Ordinarily there is no need for a lamp-reflector but the modification of FIGURES 2 and 3 illustrates a selected variation designed to concentrate and direct the light beam for maximum efficiency in four directions in substantially the same plane. The four-way reflector 74 is preferably of the parabolic type and may be made of a plastic material such as a methacrylate ester polymer, polypropylene, polystyrene, etc., metals such as aluminum or of any other suitable material of construction. Of course, the filament 27 of the bulb 26 should be located at the common focal point of all four parabolic reflectors. The reflector 74 may also be integral and of a one-piece construction or as shown herein formed of an upper and lower portion or may be constructed of multiple reflecting shell members (not shown) snapped or otherwise secured in place. All of the parabolic reflecting surfaces 76 must be metallized (e.g., silver coated or aluminized) or otherwise provided with a suitable reecting surface particularly if the reflector 74 is of a semi-transparent material. Of course, the sleeve 70 would also provide protection to the reflecting surfaces 76 from dirt and damage.

Figure 5:
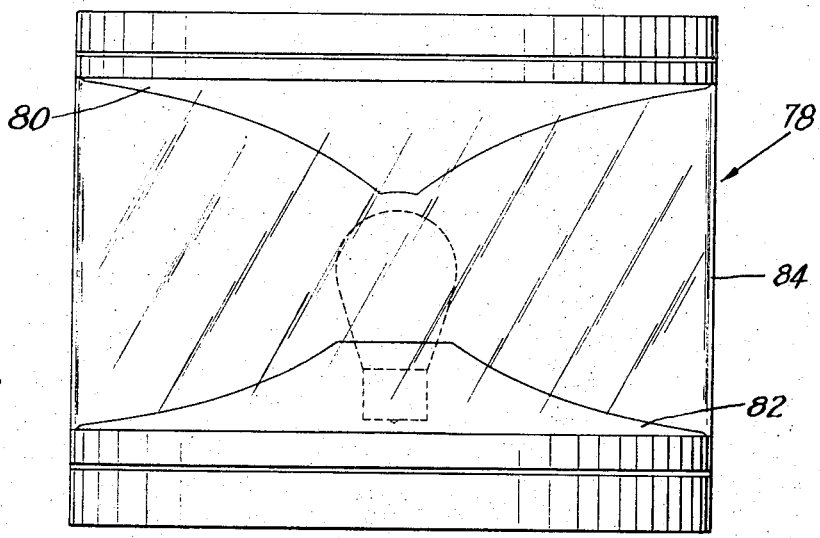
FIGURE 5 is a side elevational view of a modified form of the light reflector suitable for use in the battery powered signal unit of the invention.

Another modified reflector 78 is shown in FIGURE 5. This reflector differs from the four-way reflector 74 of FIGURES 2 and 3 in that it comprises a continuous 360 degree parabolic reflector consisting of two shaped discs 80 and 82 which together form a parabola of revolution. Sleeve 84 in this application serves an additional purpose in that it supports the two discs 80 and 82 together as a unit. When this type of reflector is employed the resultant reflected light beams appear in the form of a thin vertical line, whereas the four-way reflector produces a light beam which more closely matches the physical characteristics of the oil flame. When using the four-way reflector, however, it is necessary to "key" the lamp replacement assembly 10 to the lantern housing 12 so that the four reflectors line up opposite the four lenses 18 in the lantern housing 12.

Conventionally the bulb 26 resides in a suitable socket 86 provided in the reflector 74, as best shown in FIGURE 3. If no reflector is employed, then the socket is suitably secured to either cell in any convenient manner. The bulb filament 27 is preferably mounted at a 45 degree angle with respect to the position of the lenses 18, so that the level of illumination supplied through each lens (and through each reflector, if employed) is substantially the same. Suitable recesses 88 are provided in the bottom of the cell housings 34 so that the tie-rod ends do not extend below the base of the assembled unit. An electrolyte filling port (not shown) is suitably closed with a snap-in filler-vent plug 90 made of a caustic-resistant material such as polyethylene, polytetrafluoroethylene, copolymers of vinyl chloride and the like. The plug 90 may contain suitable venting means which can be incorporated in the filler plug such as a disc of porous polytetrafluoroethylene, wetproofed porous carbon, or like materials. The electrolyte 32 utilized in the cells 24 is of the alkaline type such as sodium hydroxide, potassium hydroxide or mixtures thereof and is usually of a desired concentration.

Figure 7:
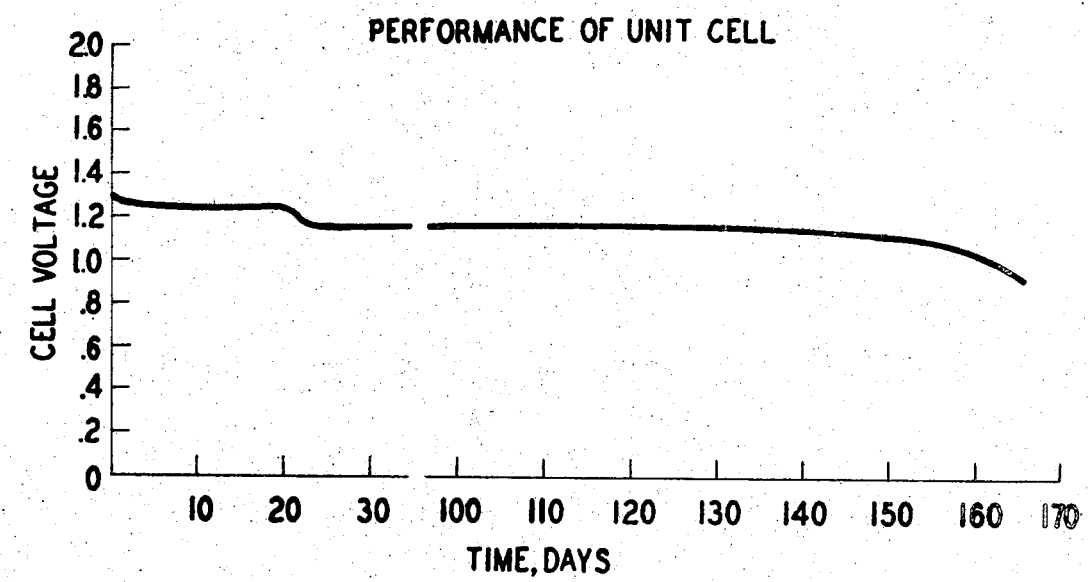
FIGURE 7 is a discharge curve of an air-depolarized cell employed in the instant invention.

The discharge curve of FIGURE 7 shows the expected life and performance output of one of the air-depolarized cells employed in the device of the invention. This cell was operated on a load equivalent to a 2.9 volt bulb (#15A/S8SC, clear, General Electric) driven by two such cells connected in series. The replacement assembly of this invention is designed for a three to six months service period depending on the current drain imposed by the particular bulb employed. Thus, the curve in FIGURE 7 simply illustrates the performance of one of the air-depolarized unit cells under a specific drain.

It will be understood that modifications and variations may be effected without departing from the spirit and scope of the novel concepts of the present invention.

What is claimed is:

1. An expendable battery powered lantern adapted to replace an oil lamp of a conventional railroad switch lamp assembly having an open top housing with a plurality of translucent windows comprising in combination, a pair of cells axially aligned and disposed apart from each other and defining a predetermined space therebetween, lamp means positioned within said space, means for electrically and mechanically connecting said cells and said lamp means as a compact replaceable unitary assembly for replacing said oil lamp of said switch lamp, said lamp means residing at an elevation in said space and being in mutual cooperative association with the plurality of translucent windows in said housing of said railroad switch lamp such that the light radiated outward from said lamp means is substantially uniform in intensity in any unobstructed direction from said lamp means.

2. The combination of claim 1 wherein said lamp means is shielded by a transparent shield disposed between said cells and about the periphery of said lantern assembly.

3. The combination of claim 1 wherein a reflector is disposed about said lamp means for concentrating and directing the light beam.

4. The combination of claim 3 wherein said reflector is a hollow four-way parabolic reflector having reflecting surfaces in a common plane which concentrate and direct the light beam at said translucent windows for maximum efficiency.

5. The combination of claim 3 wherein said reflector is a continuous 360 degree parabolic reflector formed by a pair of spaced apart discs having surfaces which cooperate to form a parabola of revolution.

6. The combination of claim 4 wherein said reflecting surfaces of said parabolic reflector are metallized.

7. The combination of claim 5 wherein said surfaces of said discs are metallized.

8. An expendable battery powered lantern adapted to replace an oil lamp of a conventional railroad switch lamp assembly having an open top housing with a plurality of translucent windows comprising in combination, a pair of cells axially aligned and disposed apart from each other and defining a predetermined space therebetween, lamp means positioned within said space, means for electrically connecting said cells and said lamp means in series, means for mechanically securing said cells and lamp means together as a compact replaceable unitary assembly for replacing said oil lamp of said switch lamp, said lamp means residing at an elevation in said space and being in mutual cooperative association with the plurality of translucent windows in said housing of said railroad switch lamp such that the light radiated outward from said lamp means is substantially uniform in intensity in any unobstructed direction from said lamp means.

9. The combination of claim 6 wherein said reflector and lamp means are shielded by a transparent shield disposed between said cells and around said reflector.

10. The combination of claim 7 wherein said reflector and lamp means are shielded by a transparent shield disposed between said cells and around said reflector.

11. The combination of claim 1 wherein switch means are provided between said lamp means and said cells.

12. The combination of claim 8 wherein switch means are provided in the electrical series circuit between said lamp means and said cells.

13. An expendable battery powered lantern adapted to replace an oil lamp of a conventional railroad switch lamp assembly having an open top housing with a plurality of translucent windows comprising in combination, a pair of air-depolarized cells having a cathode, a separator, an anode and an electrolyte therebetween, means for axially disposing said cells apart from each other so as to define a predetermined space therebetween, each of said cells having a cupped-shaped housing provided with passageways in the wall of said cupped-shaped housing, lamp means comprising a bulb positioned within said space, means for electrically and mechanically connecting said cells and said bulb as a compact replaceable unitary assembly passing through said passageways, said bulb residing at an elevation in said space and being in mutual cooperative association with the plurality of translucent windows in said housing of said railroad switch lamp such that the light radiated outward from said bulb is substantially uniform in intensity in any unobstructed direction from said bulb.

14. The combination of claim 13 wherein said means for electrically and mechanically connecting said cells and said bulb comprise a pair of conductor rods passing through said passageways and said space for holding the assembly as a unit, and conductive leads for connecting said cathode and anodes and bulb to said conductor rods.

15. The combination of claim 14 wherein said bulb is shielded by a transparent shield disposed between said cells and about the periphery of said lantern assembly.

16. The combination of claim 14 wherein a hollow four-way parabolic reflector having reflecting surfaces in a common plane is disposed about said bulb for concentrating and directing the light beam at said translucent windows for maximum efficiency.

17. The combination of claim 16 wherein said reflecting surfaces are metallized.

18. An expendable battery powered lantern adapted to replace an oil lamp of a conventional railroad switch lamp assembly having an open top housing with a plurality of translucent windows comprising in combination, a pair of air-depolarized cells having a central cathode, a separator, a pair of anodes and an electrolyte therebetween, means for axially aligning and disposing said cells apart from each other so as to define a predetermined space therebtween, each of said cells having a cupped-shaped housing provided with a pair of hollow internal ribs formed and secured to the walls of said cupped-shaped housing, said formed ribs constituting a locking mechanism between the ends of said pair of anodes for maintaining said anodes fixedly in place, a bulb positioned within said space and within a hollow four-way parabolic reflector having reflecting surfaces, tie-rods passing through said hollow internal ribs for mechanically connecting said reflector between said cells as a compact replaceable unitary assembly, means for electrically connecting said cells to said bulb, a transparent shield disposed around said reflector and said bulb, said bulb residing at an elevation in said space and being in mutual cooperative association with the plurality of translucent windows in said housing of said railroad switch lamp such that the light radiated outward from said bulb is substantially uniform in intensity in any unobstructed direction from said bulb.

References Cited
UNITED STATES PATENTS

| | | | |
|---|---|---|---|
| 554,861 | 2/1896 | Carter et al. | 240—22 |
| 1,877,785 | 9/1932 | Andrews | 240—37.1 XR |
| 2,312,649 | 3/1943 | Kelly | 240—22 XR |
| 2,344,221 | 3/1944 | Trautner | 240—22 |
| 2,629,045 | 2/1953 | Frohlich | 240—10.67 |
| 2,938,064 | 5/1960 | Kordesch | 136—86 |

NORTON ANSHER, *Primary Examiner.*

CARL J. SCHWAB, *Assistant Examiner.*